Jan. 22, 1929.
C. A. PARSONS
1,699,987
SURFACE CONDENSER
Filed March 27, 1926    5 Sheets-Sheet 1
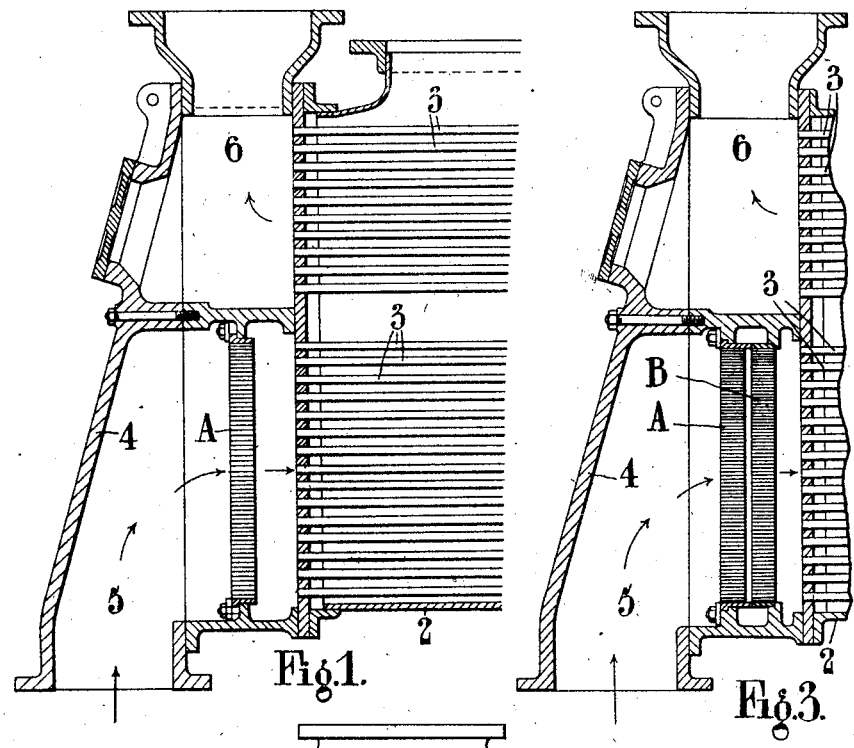
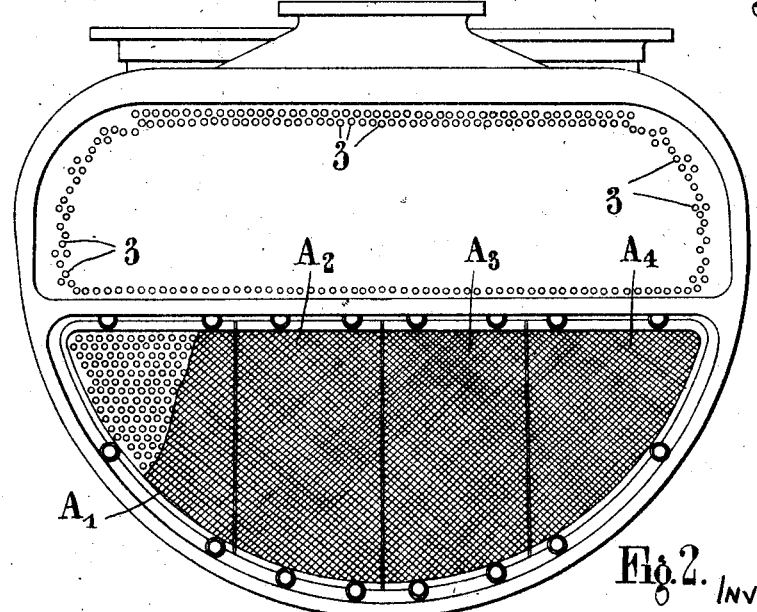
INVENTOR.
CHARLES A. PARSONS,
by Spear, Middleton, Donaldson, Hall
Attys.

Jan. 22, 1929.
C. A. PARSONS
1,699,987
SURFACE CONDENSER
Filed March 27, 1926   5 Sheets-Sheet 2
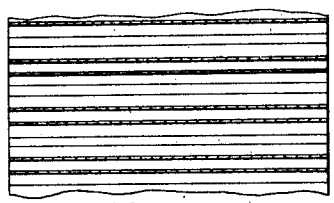
Fig.4.ᵃ
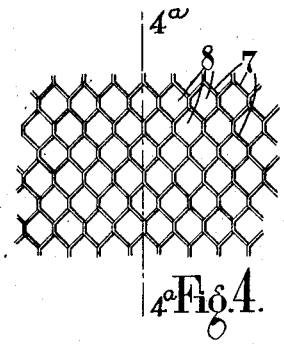
Fig.4.
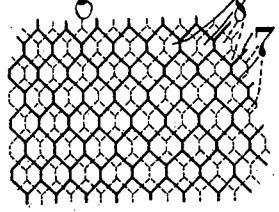
Fig.5.
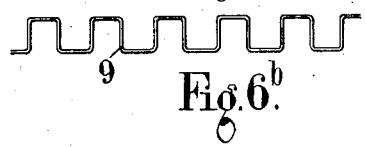
Fig.6.ᵇ
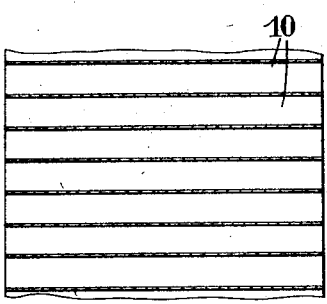
Fig.6.ᵃ
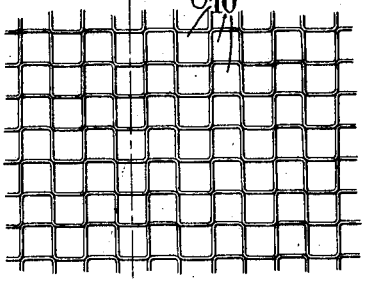
Fig.6.
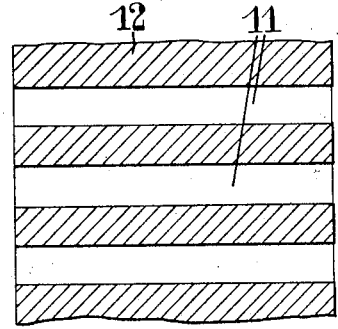
Fig.7.ᵃ
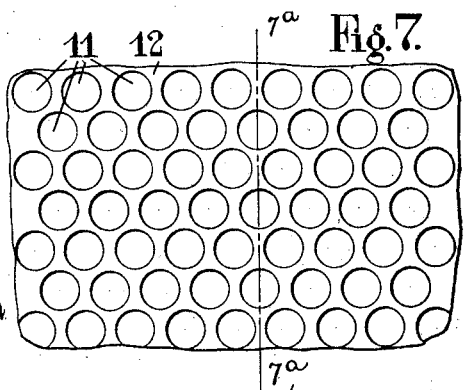
Fig.7.
INVENTOR:
CHARLES A. PARSONS
by Spear, Middleton, Donaldson & Hall
Atty,s.

Jan. 22, 1929.  1,699,987
C. A. PARSONS
SURFACE CONDENSER
Filed March 27, 1926   5 Sheets-Sheet 3
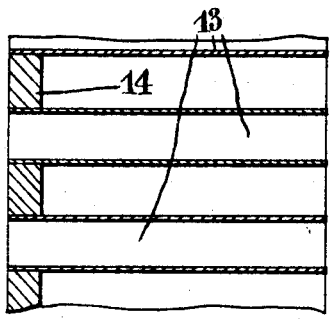
Fig.8ª.
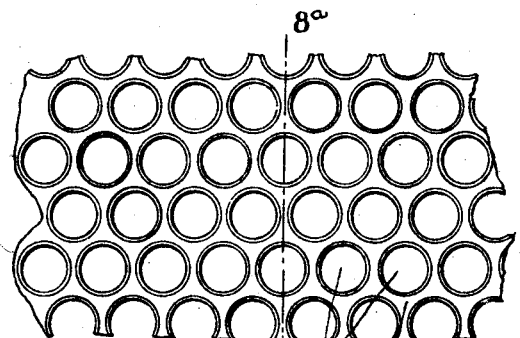
Fig.8.
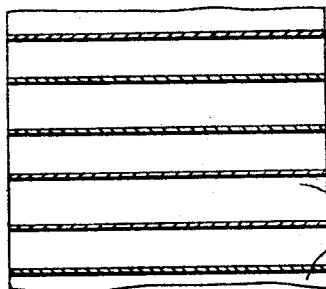
Fig.9ª
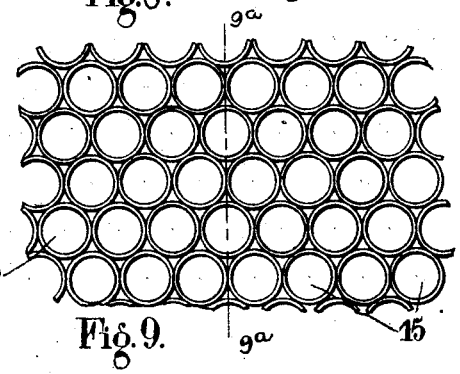
Fig.9.
INVENTOR:
CHARLES A. PARSONS.

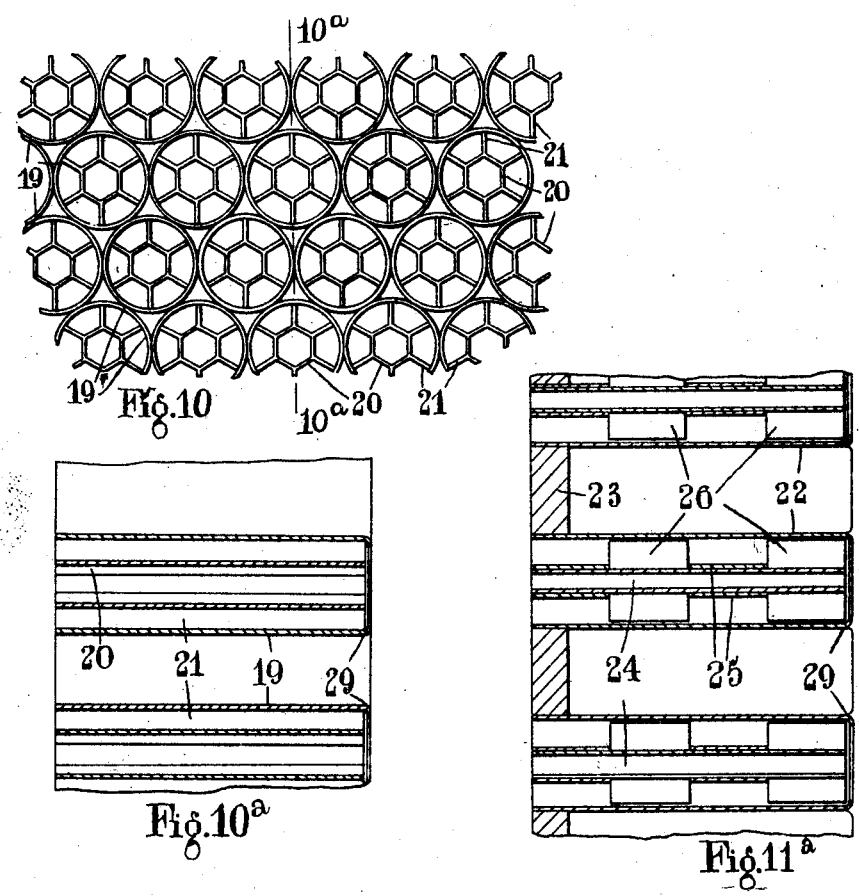

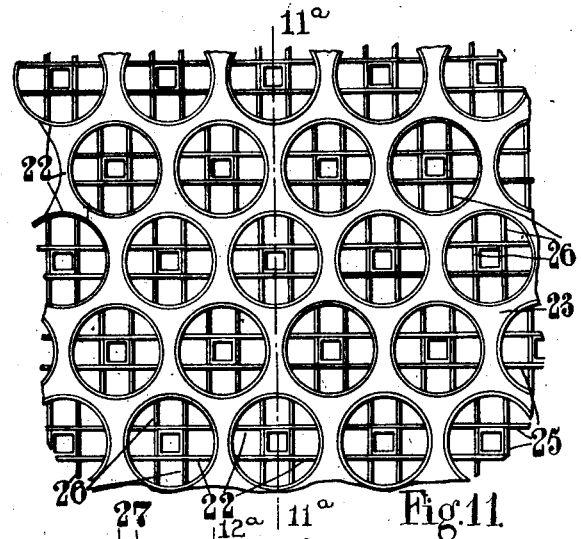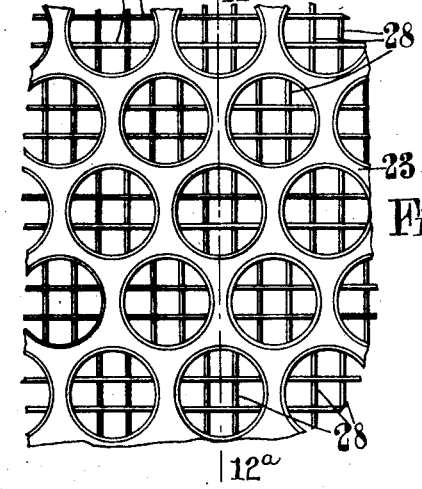

Patented Jan. 22, 1929.

1,699,987

UNITED STATES PATENT OFFICE.

CHARLES ALGERNON PARSONS, OF NEWCASTLE-ON-TYNE, ENGLAND.

SURFACE CONDENSER.

Application filed March 27, 1926, Serial No. 97,912, and in Great Britain March 30, 1925.

The main object of the present invention is to reduce or prevent erosion of the tubes of surface condensers.

With such an object, the invention consists in the combinations of elements hereinafter described and particularly pointed out in the claims.

The accompanying drawings which are to a certain extent of a diagrammatic nature, show different illustrative forms of the invention.

Figure 1 shows in sectional elevation the water box and adjacent parts of a steam condenser fitted with a screen according to one form of the present invention, Figure 2 being an end view showing the screen in four parts for convenience in manufacture;

Figure 3 is a view similar to Figure 1 showing two screens;

Figures 4 and 4$^a$ show respectively end view and section of a screen built up as a honeycomb radiator, Figure 5 being a view similar to Figure 4 showing two such screens in staggered relation;

Figures 6 and 6$^a$ are similar views of a modification in which the passages are square, Figure 6$^b$ showing a view of one of the elements before assembly;

Figures 7 and 7$^a$ show end view and section respectively of a plate through which holes are drilled, Figures 8 and 8$^a$ being similar views in which short lengths of tube are expanded at one end in a tube plate, while Figures 9 and 9$^a$ show a form in which similar short lengths of tubes are placed in contact and soldered together;

Figures 10 and 10$^a$ show similar views of a modification similar to that shown in Figure 9, but with larger tubes, each fitted with its own individual guide member;

Figures 11 and 11$^a$ show end view and section of a form in which the guide member consists of pairs of parallel plates alternately at right angles mounted on a central tube, square in cross-section; while finally Figures 12 and 12$^a$ show a modification of the last described form in which the pairs of parallel plates are continuous throughout the thickness of the screen.

In the end views and sections of screens referred to above, the line on which the section is taken is indicated by numerals corresponding to the number of the corresponding end view.

Referring to Figure 1, the main body of the condenser, 2, is shown fitted with condenser tubes, 3, the water box, 4, having an inlet portion, 5, and an outlet portion, 6, through which the water flows in the direction of the arrows. Attached to the water box in front of the inlets to the condenser tubes, 3, and spaced apart therefrom is a screen, A, formed of a series of elongated and juxtaposed ducts with their axes parallel to those of the condenser tubes, the pitch of which is larger than that of the ducts, as shown in Figures 1 and 2.

In Figure 2 the screen is shown in four parts, A$^1$, A$^2$, A$^3$, A$^4$, for convenience of manufacture, while in Figure 3, two screens, A and B, are shown one behind the other.

According to one illustrative type, the screens may be constructed to resemble the honeycomb radiators of motor cars, examples of such a construction being shown in Figures 4 to 6$^b$.

In Figures 4 and 4$^a$, thin plates, 7, are shown bent into zigzags and soldered or otherwise secured together to form hexagonal ducts, 8.

In Figure 5 two of such screens are shown respectively in full and dotted lines, the individual screens being in staggered relation as shown for application in a two-screen construction as illustrated in Figure 3.

In Figures 6, 6$^a$ and 6$^b$, the plates, 9, are bent into the shape shown in the Figure 6$^b$, and assembled to form a screen with rectangular ducts, 10, (see Figure 6) the plates being secured together in any desired manner.

Another type of construction comprises a series of tubes or their equivalent with unobstructed apertures as shown in Figures 7 to 9$^a$.

Thus, in Figures 7 and 7$^a$, holes, 11, are drilled through plates, 12, of a thickness equal to that of the screen.

In Figures 8 and 8ª, lengths of tube, 13, each equal in length to the thickness of the screen are expanded in a comparatively thin plate, 14.

In Figures 9 and 9ª, an assembly of short lengths of tube, 15, is shown piled on one another in regular formation and soldered or otherwise secured together.

In Figures 8, 8ª, 9 and 9ª the screen is illustrated as composed of round tubes, but it is to be understood that tubes of any other cross-sectional shape may be used.

Finally, another illustrative method of building up the screen is shown in the remaining figures, where short lengths of tubes are combined with internal guide members.

In Figures 10 and 10ª, a series of short lengths of tubes, 19, equal in length to the thickness of the screen are attached to one another in the manner described with reference to Figures 9 and 9ª, while in each is inserted a guide member comprising a hexagonal portion, 20, with radial webs, 21, extending from the angles thereof to the surrounding wall of the particular tube in which it is inserted.

In Figures 11 and 11ª, the tubes, 22, are expanded into a thin tube plate, 23, as in Figures 8 and 8ª but are of larger diameter. In each of these tubes is inserted a guide member which may consist of a central tubular portion, 24, square in shape with pairs of webs, 25, 26, projecting therefrom in line with the sides of the square, the pairs, 25, 26, being alternately arranged at right angles as clearly shown in Figure 11ª.

Finally, in Figures 12 and 12ª, the tubes, 22, are expanded into a tube plate, 23, as last described, but the individual guiding members inserted in the tubes consist of pairs of webs, 27 and 28, slit for half their length and inserted into one another as shown in Figure 12ª.

In the form shown in Figures 10ª, 11ª and 12ª, the ends of the tubes, 19 and 22, are bent slightly inwards as indicated at 29, to hold the guide member, but any other means may be used for the same purpose.

When two or more screens are fitted in series as in Figure 3, their ducts may with advantage be of different shape in end view.

It will be seen from the above description that the ducts through the screen or the sub-ducts into which they are divided by the guiding partitions are in all cases of prismatic or circular form, or in other words the walls of the passages or sub-passages may be considered as generated or swept out by a straight line moving parallel to the axes of the main condenser tubes.

In some cases the screens may be associated only with groups of tubes or even with individual tubes, to correspond with the areas liable to erosion.

As usually constructed heretofore, a large amount of turbulence exists in the water boxes of surface condensers at the entry end, this turbulence leading to the formation of vortices and regions of reduced pressure and even of vacuous cavities in the water entering the tubes, thereby causing rapid erosion of the tubes over certain areas.

In contrast to the above, by means of the present invention, a considerable body of water in a state of comparative quiescence is secured between the screen and the condenser tube plate, the length of the passages through the screen in proportion to their transverse dimensions tending to steady the flow by annulling cross motion in the issuing stream of water while the smallness of the mesh of the screen minimizes the diameter of any whirl that may pass through and secures its extinction by the frictional drag of the dead water; the condenser tubes are thus fed from quiescent instead of from turbulent water and erosion is thereby reduced or prevented.

It will be understood that the screens may take forms other than those described above so long as they fulfil the necessary conditions.

Having now described my invention what I claim as new and desire to secure by Letters Patent is:—

1. In combination in a condenser, a water box having walls; a tube plate constituting one of said walls; a series of condenser tubes passing water-tight through said tube plate and communicating with said water box; and screening means disposed within said water box and in operative association with certain of the walls thereof to enclose the entry ends of said condenser tubes, said screening means being spaced away from said tube ends to leave a substantial body of intermediate water and comprising a series of closely juxtaposed ducts long in relation to their transverse dimensions and of an aggregate cross-sectional area at least equal to the aggregate cross-sectional area of said condenser tubes.

2. In combination in a condenser, a water box having walls; a tube plate constituting one of said walls; a series of condenser tubes passing water-tight through said tube plate and communicating with said water box; and screening means disposed within said water box and in operative association with certain of the walls thereof to enclose the entry ends of said condenser tubes, said screening means being spaced away from said tube ends to leave a substantial body of intermediate water and comprising a series of closely juxtaposed ducts long in relation to their transverse dimensions and pitched apart at a distance less than the distance between said condenser tubes and of an aggregate cross-sectional area greater than the aggregate cross-sectional area of said condenser tubes.

3. In combination in a condenser, a water box having walls; a tube plate constituting one of said walls; a series of condenser tubes passing water-tight through said tube plate and communicating with said water box; and screening means disposed within said water box and in operative association with certain of the walls thereof to enclose the entry ends of said condenser tubes, said screening means comprising a series of juxtaposed ducts long in relation to their transverse dimensions of a form polygonal in cross section.

In testimony whereof I have signed my name to this specification.

CHARLES ALGERNON PARSONS.